United States Patent Office 2,766,276
Patented Oct. 9, 1956

2,766,276

NEUTRALIZATION OF SULFONIC ACIDS

Helmut Kolling, Duisburg-Hamborn, Germany, assignor to Ruhrchemie Aktiengesellschaft, Oberhausen-Holten, Germany, a German corporation No Drawing. Application April 22, 1952, Serial No. 283,765

Claims priority, application Germany April 25, 1951

7 Claims. (Cl. 260—505)

This invention relates to improvements in the neutralization of sulfonic acids and sulfuric acid esters. It more particularly relates to a process for the neutralization of sulfonic acids and sulfuric acid esters with liquid alkali carbonates.

As is known, it is often sufficient to recover sulfonate solutions after the neutralization of alkyl aryl sulfonic acids or of sulfuric acid esters prepared from aliphatic alcohols. These sulfonate solutions are frequently used only for the preparation of light duty or heavy duty detergents. For the preparation of these detergents the sulfonate solutions are atomized in a hot and dissolved state with other materials such as with polyphosphates, sodium sulfate, soda, metasilicates, or carboxy methyl cellulose.

Up to the present, the neutralization of sulfonic acids and sulfuric acid esters to form the sulfonate solutions has generally been effected with an aqueous solution of an alkali hydroxide. The sulfonic acids or the sulfuric acid esters are conventionally slowly poured into the aqueous solution of alkali hydroxide, while the solution is stirred vigorously. In commercial operation this process may be carried out intermittently or continuously. Since it is not feasible to effect this neutralization with alkali carbonates, i. e. sodium carbonate, due to the considerable foaming which takes place, it is necessary to use the relatively expensive alkali hydroxides. This, of course, results in a marked economic disadvantage.

One object of this invention is the neutralization of sulfonic acids and sulfuric acid esters with alkali carbonate solutions. This, and still further objects, will become apparent from the following description:

It has now been found in accordance with the invention that a very satisfactory neutralization of alkyl aryl sulfonic acids and sulfuric acid esters can be effected with alkali carbonates if the neutralization is effected with the reactants in a finely dispersed, such as an atomized, form. The sulfonic acids or the sulfuric acid esters are finely dispersed by being atomized. The aqueous solutions of alkali carbonates are atomized in a like manner, and the two atomized reactants are directed in contact with each other. As close to stoichiometric quantities as is possible of the reactants should be used.

The atomization is preferably effected at the top of a tower-like container or reaction chamber from separate outlet openings which are arranged as closely as possible together. The neutralized solution which will result from the contacting is removed from the bottom of the tower-like container and the gas quantities remaining after the atomization of the solution are conducted away and washed. The washing is preferably effected with water in any conventional manner and small quantities of liquid are continuously or intermittently transferred from the washing liquid cycle to the neutralized solution collecting at the bottom of the tower. Due to the fact that the two reactants act upon each other in a fine dispersion, the reaction proceeds in an extremely short time. No difficulties are encountered in the formation of carbon dioxide, since it may escape without any hindrance into the tower atmosphere as it forms.

The atomization of the reactants, i. e. the sulfonic acids or the sulfuric acid esters and the alkali carbonate solutions, may be effected by two spray nozzles arranged side by side at the top of a reaction tower. The outlet openings of the nozzles should be directed toward each other in such a way that an intimate mixing of the liquids being sprayed is obtained. It is, however, also possible to use concentrically arranged nozzles, so that one of the reacting components is sprayed from an annular nozzle, while the other reacting component is sprayed within the spray from this annular nozzle.

The tower-like reaction container, which may, for example, have the form of a cylinder, must be of sufficient height and diameter that the sprayed material will not reach the bottom thereof before the reaction is substantially complete. The neutralized reaction product collects at the bottom of the tower in the form of an aqueous solution. This aqueous solution is then removed to a second container. The air used for the atomization of the reactants escapes through openings arranged in the tower wall or at the top of the tower. The air is passed to a washing operation, which may be in the form of an absorption tower, together with the gaseous components formed during the reaction.

This absorption tower may be constructed as a washing column, which may have the form of packed columns, bubble towers, sieve tray columns or simple spray towers. The washing of the gaseous components may be carried out with particular advantage in towers through which the washing liquid is sprayed in downward direction. The washing solution is used at a temperature of 0–30° C. and preferably of 10–20° C. The washing solution may be interchanged at any optional concentration. A concentration of 50% of sulfonate should preferably not be exceeded.

The water which is circulated through the tower to effect the washing becomes enriched with sulfonate and small quantities are withdrawn and transferred to the bottom of the neutralization tower. The quantities of wash water so withdrawn are replaced by corresponding quantities of fresh water.

The neutralized solution formed at the bottom of the reaction tower is expediently passed at first into a vessel with a stirrer where the pH value of this solution may be adjusted if necessary or required by the addition of small quantities of either acids or alkalis. The acids used are preferably sulfonic or sulfuric acids, and the alkalis used are preferably alkali hydroxide or alkali carbonate. Thereafter, the finished aqueous solution of the neutralized alkyl sulfonic acids or neutralized sulfuric acid esters is available for further utilization as raw material for the preparation of detergents or the like.

The alkyl aryl sulfonic acids which may be processed in accordance with the invention contain 4–20 carbon atoms in their aliphatic side chains. The sulfonic acids may contain 1–2 aromatic rings which, as the case may be, contain hydroxyl groups as additional substituents. In the same way, sulfuric acid esters may be processed which have been prepared from alcohols or olefins having preferably 12–18 carbon atoms. Also alcohols or olefins of any carbon number may be used for the preparation of the sulfuric acid esters.

Carbonates or bicarbonates of sodium, potassium, or ammonium, preferably sodium carbonate, are suitable for the neutralization. These carbonates or bicarbonates are used in a commercial purity. The concentration of the solutions prepared thereof amounts to 10–20% of carbonate.

The sulfonic acids and sulfuric acid esters being processed may be diluted with up to 90% of water. A dilution with 5–10% of water is preferably used. All of the reactions are carried out at normal atmospheric pressure. The sulfonic acids or the sulfuric acid esters are used at a temperature of 10–60° C. and the alkali carbonate solutions serving for the neutralization at a temperature of 10–30° C. In general, stoichiometric quantities of the acid and alkaline starting materials are used. A small excess of the alkaline component may be used.

The final adjustment of the pH value is effected with any of the solutions of NaOH, KOH, NH4OH, Na2CO3, K2CO3 or ammonium carbonate, if excess acid is to be neutralized. It is most convenient to use for this purpose 10 to 20% solutions of the materials mentioned above. Sulfonic acids, sulfuric acid esters, sulfuric acid, hydrochloric acid, or phosphoric acid of any concentration may be used to avoid a too strong alkaline reaction. 20–50% acids are suitably used for this purpose. It is of particular advantage to carry out the final adjustment of the pH value with sulfonic acids or soda in such a way that the finished product has a pH value of 7–10 and preferably of 7–7.5.

The following example is given to illustrate the invention but not to limit the same.

*Example*

20 kilos of a sulfonic acid which had been prepared by sulfonating monoalkyl benzene having an aliphatic side chain of 10 carbon atoms, were, at a temperature of 40° C. hourly atomized together with 35 kilos of a 15% sodium carbonate solution at the top of a tower 2 m. high and 1.5 m. in diameter. The atomization was effected by means of compressed air. Prior to the atomization, the sulfonic acid had been diluted with 5% of water and contained 85% of monoalkyl benzene sulfonic acid and 10% of sulfuric acid.

The neutralized aqueous sulfonate solution collected at the bottom of the reaction tower while the air used for the atomization was led off at the top of the tower. The escaping air streamed through a washing tower of 2 meters in height and 200 mm. in diameter filled with Raschig rings. 30 liters per hour of fresh water were added to the washing water cycle of the washing tower while the corresponding quantity, after enrichment with sulfonate, was intermittently withdrawn from the cycle and admixed with the sulfonate solution resulting in the reaction tower.

The sulfonate solution withdrawn from the bottom of the reaction tower was passed through a vessel with stirrer of 200 liters capacity where it was adjusted to the pH value desired by the addition of acid or sodium carbonate. Thereafter, the finished sulfonate solution was available for further processing.

I claim:

1. Process for the neutralization of sulfonic acids with alkali carbonates, which comprises establishing a reaction zone, passing an atomized, finely dispersed stream of an aqueous solution of an alkali carbonate into the top of said reaction zone, passing a separate, atomized, finely dispersed stream of a sulfonic acid into the top of said zone in intimate contact with said alkali carbonate, said alkali carbonate and said sulfonic acid being passed into said zone in substantially stoichiometric quantities, removing the resulting neutralized solution from the bottom of said zone, removing gas quantities remaining in said zone, washing the removed gas quantities with a washing liquid, and transferring small quantities of the washing liquid after said washing to the neutralized solution.

2. Process according to claim 1, in which small quantities of the washing liquid after said washing are intermittently transferred to the neutralized solution.

3. Process according to claim 1, in which small quantities of the washing liquid after said washing are continuously transferred to the neutralized solution.

4. Process according to claim 1, in which said sulfonic acids are diluted with small quantities of water before said contacting.

5. Process according to claim 1, which includes removing said neutralized solution from said zone, agitating said removed solution, and adjusting the pH of said solution to a predetermined value.

6. Process according to claim 1 in which said washing liquid is water.

7. In a process for the neutralization of sulfonic acids with alkali carbonates, which comprises establishing a reaction zone, passing an atomized, finely dispersed stream of an alkali carbonate into the top of said reaction zone, passing a separate, atomized, finely dispersed stream of a sulfonic acid into the top of said zone in intimate contact with said alkali carbonate, said alkali carbonate and said sulfonic acid being passed into said zone in substantially stoichiometric quantities, removing the resulting neutralized solution from the bottom of said zone, removing gas quantities remaining in said zone, the improvement which comprises washing said gas from said zone with a washing liquid, and transferring small quantities of the washing liquid after said washing to the neutralized solution.

References Cited in the file of this patent

UNITED STATES PATENTS

| | | |
|---|---|---|
| 2,075,915 | Snoddy et al. | Apr. 6, 1937 |
| 2,174,110 | Reed | Sept. 26, 1939 |
| 2,214,254 | Mills et al. | Sept. 10, 1940 |
| 2,325,320 | Holuba | July 27, 1943 |
| 2,594,875 | Condit | Apr. 29, 1952 |
| 2,613,218 | Stoneman | Oct. 7, 1952 |
| 2,671,797 | Hagemann et al. | Mar. 9, 1954 |

OTHER REFERENCES

Ser. No. 132,770, Hentrich et al. (A. P. C.), published June 15, 1943.